(12) United States Patent
Corliss

(10) Patent No.: US 7,077,549 B1
(45) Date of Patent: Jul. 18, 2006

(54) VEHICLE WARNING LIGHT SYSTEM

(76) Inventor: Joseph J. Corliss, 23508 Sugar View Dr., Clarksburg, MD (US) 20871

( * ) Notice: Subject to any disclaimer, the term of this patent is extended or adjusted under 35 U.S.C. 154(b) by 137 days.

(21) Appl. No.: 10/770,560

(22) Filed: Feb. 4, 2004

(51) Int. Cl.
*B60Q 1/30* (2006.01)
*G08G 1/00* (2006.01)

(52) U.S. Cl. ............... 362/499; 362/541; 340/479; 340/902

(58) Field of Classification Search ........... 362/499, 362/542, 541, 540, 385; 340/466, 467, 479, 340/463, 464, 431, 902
See application file for complete search history.

(56) References Cited

U.S. PATENT DOCUMENTS

| | | | |
|---|---|---|---|
| 3,593,278 A | 7/1971 | Bower et al. | |
| 3,846,749 A | 11/1974 | Curry | |
| 3,939,316 A | 2/1976 | Stropkay | |
| 4,170,723 A | 10/1979 | Arsoy | |
| 4,600,913 A * | 7/1986 | Caine | 362/541 |
| 4,859,982 A * | 8/1989 | Seaburg | 362/464 |
| 4,901,055 A | 2/1990 | Rosenberg et al. | |
| 4,983,953 A | 1/1991 | Page | |
| 5,089,805 A | 2/1992 | Salsman | |
| 5,148,147 A | 9/1992 | Kobres | |
| 5,434,554 A * | 7/1995 | Caesar | 340/468 |
| 5,504,472 A * | 4/1996 | Wilson | 370/479 |
| 5,666,103 A * | 9/1997 | Davis, Jr. | 362/540 |
| 5,725,228 A * | 3/1998 | Livingston | 362/477 |
| 6,121,896 A * | 9/2000 | Rahman | 340/902 |
| 6,278,360 B1 * | 8/2001 | Yanagi | 340/436 |
| 6,356,189 B1 * | 3/2002 | Fujimaki | 340/465 |
| 2003/0137408 A1 * | 7/2003 | Breiner | 340/425.5 |

* cited by examiner

*Primary Examiner*—Ali Alavi
*Assistant Examiner*—Bao Q. Truong
(74) *Attorney, Agent, or Firm*—Norman Rainer

(57) ABSTRACT

A vehicle warning light system employs sensors associated with the brake and accelerator pedals to generate warning light signals at the front and rear of the vehicle to indicate whether the vehicle is in a coasting state, or is undergoing mild or severe deceleration. An electronic equivalent of the light signals is also generated and transmitted to a following vehicle which converts the electronic signals to corresponding light signals at the rear of the following vehicle.

4 Claims, 1 Drawing Sheet

VEHICLE WARNING LIGHT SYSTEM

BACKGROUND OF THE INVENTION

1. Field of the Invention

The present invention concerns a system for use in automotive vehicles for warning following vehicles as to conditions of deceleration or impending deceleration, thereby providing operators of following vehicles with sufficient advance information to better avoid collision with the forward vehicle in a deceleration situation.

2. Description of the Prior Art

As part of the effort to reduce automobile accidents, there has been an increasing emphasis on enhancing the visibility of brake lighting. Brake lights have become larger and more numerous, including the advent of the high mount brake light system which is mounted on the shelf under the rear window or on the trunk. However, the current state of automobile brake lighting has typically provided for only a single intensity, that is, the brake lights are either on or off. In many instances, safety would be enhanced if a driver approaching from the rear could determine at what rate the forward automobile is braking or has braked.

Despite the advent of the high mount brake light system, rear-end collisions are still occurring at an alarming rate. Rear-end automobile collisions account for approximately two-thirds of the auto accidents occurring worldwide. The majority of all chain accidents occur during rush-hour traffic jams. Under those conditions, drivers often do not have enough time to react to one anothers movements. As it appears to be impossible to force drivers to maintain safe distances between cars, other solutions must be found.

Various devices and systems have been disclosed which are directed toward the prevention of rear-end collisions and their severity by advancing the reaction-braking response, particularly in emergency braking situations. The following patents disclose various types of such early warning systems.

| Patent No. | Inventor |
| --- | --- |
| 3,395,388 | Hendrickson |
| 3,497,871 | Damico |
| 3,596,020 | Warren |
| 3,601,796 | Mortimer |
| 3,881,078 | Kazanecki |
| 3,911,394 | Shames |
| 3,912,892 | Morehouse |
| 3,921,750 | Shames |
| 4,021,775 | Leu |
| 4,173,012 | Burger |
| 4,686,503 | Miller |
| 4,901,055 | Rosenberg |
| 4,983,953 | Page |
| 5,148,147 | Kobres |

Mortimer discloses an accelerator release signal light delay actuator which delays actuation of the brake light upon release of the driver's foot from the accelerator pedal for 5 or 6 seconds following release of the accelerator. After the delay period is past, if the brake has not yet been applied, the brake lights are turned on at an intensity less than the intensity available when the brakes are actually actuated. Thus, the possibility of false indication is decreased since the person behind the front car recognizes the decreased intensity of the light indicating that the brake has not itself been actuated.

Morehouse discloses an automobile deceleration warning system in which an auxiliary pedal is positioned above the main accelerator pedal. A normally opened switch is positioned between the two pedals. Upon release of the auxiliary pedal, the switch closes, thereby lighting the brake light. According to the patent, a resistor may be included which reduces the current flow to the brake lights, thus lighting the brake lights at a lower intensity when the lights are actuated in response to the lifting of the accelerator pedal as compared with the intensity of the brake lights when the brakes are actually applied.

The Shames patents disclose a vehicle brake light warning system in which the brake lights are activated for a given period of time upon release of the accelerator pedal. This time period is sufficient for the driver to lift his foot from the accelerator to the brake pedal. If the brakes are not applied within that time period, the brake lights are turned off.

Burger, Leu, Kazanecki, Warren and Miller all disclose alternate systems for providing early warning of brake activation by turning on the brake light or alternative lights upon release of the accelerator pedal.

However, all of the above-noted patents suffer from a significant disadvantage in that no differentiation is made between panic stop behavior and non-panic stop behavior. Each of these devices result in a high rate of "false alarms" which can lead to a decrease in the overall warning value of the stop lamp signal itself, due to a "cry wolf" phenomenon. This leads to a significant reduction in the effectiveness of these systems.

European Pat. No. 0 219 858 discloses a device which remains ineffective in non-emergency cases. The advanced braking light device (ABLD) is an electronic device installed on a vehicle accelerator pedal. When a leading vehicle driver attempts a panic-braking operation, the accelerator pedal is released by a sudden movement when the driver's leg is shifted to apply the brake pedal as quickly as possible.

The sudden release is sensed by the ABLD and immediately after the accelerator pedal is released, the stop lights are activated. This advanced activation of the stop lights, by a fraction of 0.2–0.3 seconds, which is approximately the time necessary for the driver to move his leg from the accelerator to the brake, enables the following vehicle driver to start his reaction to the braking at an earlier stage, thus improving his chances of preventing a collision or reducing the severity thereof. The brake lights remain lit for only 1 second if the brake pedal is not actuated.

Although the advanced warning systems of the aforesaid patents are useful, they generally address only specific factors relative to driver-induced deceleration and intended deceleration aspects of vehicles. Also, there is no consideration of the plight of the second following vehicle behind the decelerating vehicle, whose vision of the tail lights of the decelerating vehicle is blocked by an intervening large first following vehicle. An additional margin of response time is usually provided to the operator of the vehicle when the actions of vehicles in front of the immediately preceding vehicle are observable. However, when the immediately preceding vehicle is of large size, such as a van, truck or sport utility vehicle (SUV), all vision of vehicles in front of such large vehicle is obscured, whereby any warning light system of the decelerating vehicle would not be perceived by the operator of said second following vehicle.

It is accordingly an object of the present invention to provide a vehicle warning light system that indicates to following vehicles the intended and current deceleration status of the vehicle.

It is another object of this invention to provide a warning light system as in the foregoing object which transmits warning status to the immediately following vehicle, which in turn provides said warning status to a second following vehicle.

It is a further object of the present invention to provide a warning system of the aforesaid nature which can be retrofitted to existing vehicles.

These objects and other objects and advantages of the invention will be apparent from the following description.

SUMMARY OF THE INVENTION

The above and other beneficial objects and advantages are accomplished in accordance with the present invention by a vehicle warning light system interactive with a front vehicle's accelerator and brake pedals to indicate by way of front and rear mounted light signals the status of said pedals with respect to:
a) non-depression of the accelerator pedal, thereby indicating a coasting state of the vehicle,
b) depression of both accelerator and brake pedals, thereby indicating an indeterminate state of the vehicle,
c) moderate depression of the brake pedal, thereby producing a light signal whose intensity is proportional to the force on the brake pedal,
d) hard depression of the brake pedal, thereby producing a light signal which indicates immediate stopping of said vehicle,
e) acceleration, wherein the brake pedal is non-depressed, and the accelerator pedal is depressed, and
f) engagement of an automatic speed control device, said warning light system further comprising:
1) radio transmitting means for conveying signals to an immediately following vehicle the aforesaid pedal status, and
2) activating means interactive with said conveyed signals to reproduce at the front and rear of said following vehicle light signals corresponding to the light signals of said front vehicle.

In preferred embodiments, a warning light is also provided which indicates that a cell phone is in use. In the case of large vehicles, a receiver would be positioned on the front of the vehicle, and would simultaneously produce a corresponding warning indicator at the rear of said large vehicle.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
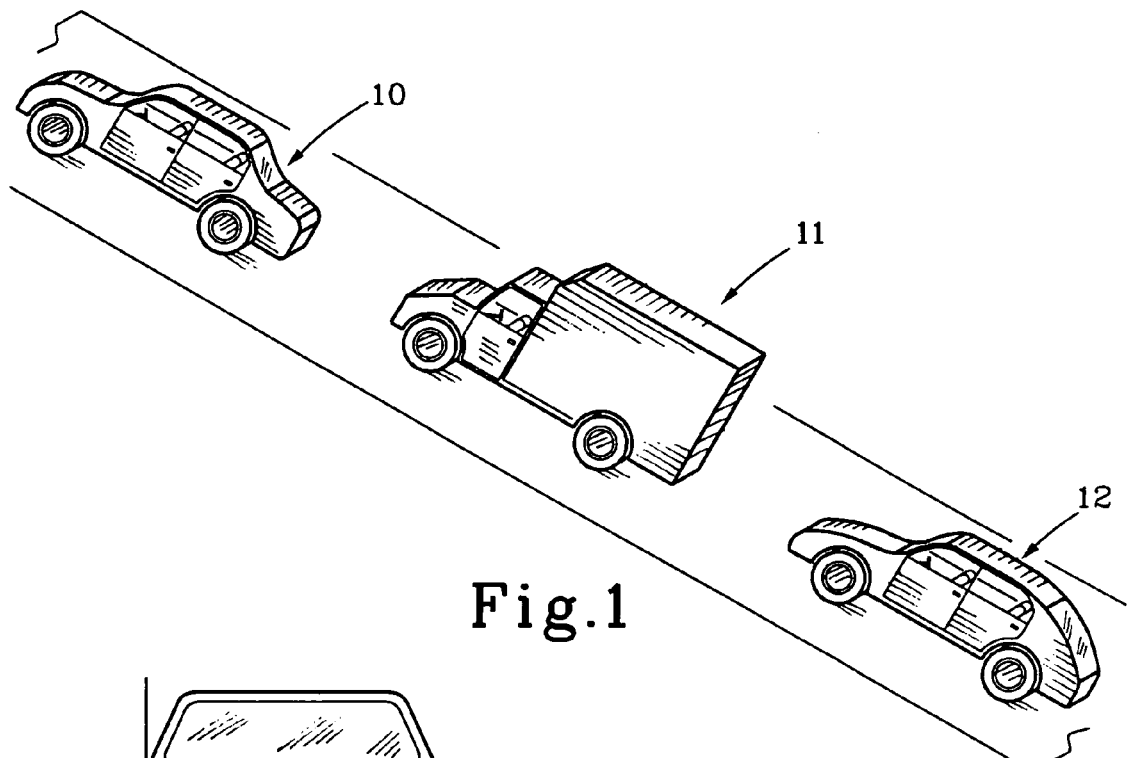
FIG. 1 is a perspective schematic view showing how the warning system of this invention is interactive between a front vehicle and first and second following vehicles.
Figure 2:
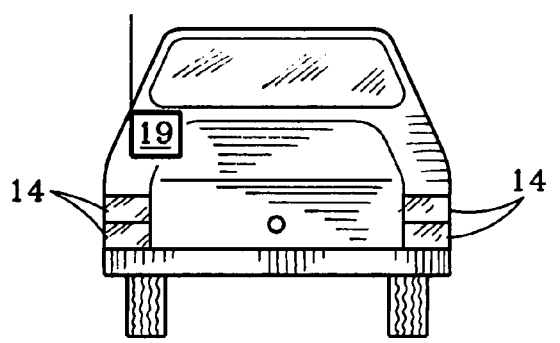
FIG. 2 is a rear view of a vehicle equipped with the warning system of this invention.
Figure 3:
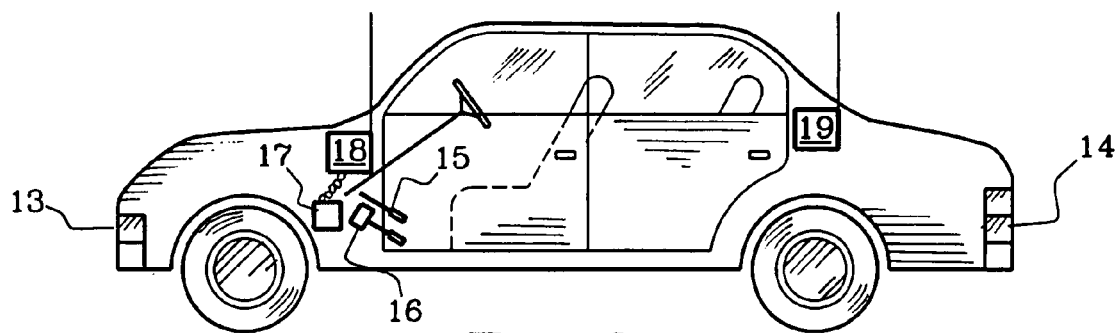
FIG. 3 is a schematic side view of a vehicle equipped with the warning system of this invention.

Referring now to FIGS. 1–3, an embodiment of the warning system of the present invention is shown in operative association with a front vehicle 10, first following vehicle 11, and second following vehicle 12. Each vehicle is equipped with conventional front and rear lights 13 and 14, respectively, accelerator pedal 15, and brake pedal 16.

Associated with said accelerator and brake pedals is electrical sensing means 17 capable of detecting the following conditions of said pedals:
a) non-depression of the accelerator pedal, which indicates a coasting state of the vehicle,
b) depression of both accelerator and brake pedals, which indicates an indeterminate state of the vehicle,
c) moderate depression of the brake pedal, which produces a light signal whose intensity is proportional to the force applied to the brake pedal,
d) hard depression of the brake pedal, which produces a light signal that indicates immediate stopping of the vehicle,
e) acceleration, wherein the brake pedal is non-depressed, and the accelerator pedal is depressed, and
f) engagement of an automatic speed control device.

Condition a) represents an essentially standard configuration in present day vehicles. Condition b) is detected by electrical circuitry that detects force applied to both accelerator and brake pedals at the same time. Condition c) is detected and displayed by way of techniques disclosed in U.S. Pat. Nos. 3,593,278; 3,846,749; 3,939,316 and 4,170,723. In said techniques, braking force is converted to electrical signals which cause the brake lights to have either variable intensity or adjustable flashing frequency, said intensity or flashing frequency being proportionate to force applied to the brake pedal. Condition d) is achieved by a modification of technique c) wherein a separate or differently colored light is illuminated by virtue of extreme pressure applied to the brake pedal. Condition f is sensed by electrical interaction with the cruise control system of the vehicle.

A radio transmitting apparatus 18 is interactively associated with electrical sensing means 17 in a manner to transmit control signals to a receiver 19. Every vehicle compatible with the warning light system of this invention will have the same or similar components, including a receiver 19. Suitable transmitting and receiving devices may be similar in nature to citizen's band (CB) radio equipment well known for use in vehicles.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. A vehicle warning light system interactive with a front vehicle's accelerator and brake pedals to indicate by way of front and rear light signals the status of said pedals with respect to:
    a) non-depression of the accelerator pedal, thereby indicating a coasting state of the vehicle,
    b) depression of both accelerator and brake pedals, thereby indicating an indeterminate state of the vehicle,
    c) moderate depression of the brake pedal, thereby indicating intended deceleration,
    d) hard depression of the brake pedal, thereby indicating immediate stopping of said vehicle, e) acceleration, wherein the brake pedal is non-depressed, and the accelerator pedal is depressed, and
f) engagement of an automatic speed control device, said warning light system further comprising:
g) radio transmitting means for conveying electronic signals corresponding to the status of said pedals and automatic speed control device to an immediately following vehicle, and
h) activating means interactive with said conveyed electronic signals to reproduce at the rear of said following vehicle other light signals corresponding to the light signals of said front vehicle.

2. The warning light system of claim 1 further comprising a warning light that indicates that a cell phone is in use in said front vehicle.

3. The warning light system of claim 1 wherein said radio transmitting means is a citizen's band transmitter.

4. The warning light system of claim 1 wherein said moderate depression of the brake pedal produces a light signal whose intensity is proportional to the force on said brake pedal.

\* \* \* \* \*